United States Patent [19]

Walters

[11] 4,408,272

[45] Oct. 4, 1983

[54] DATA CONTROL CIRCUIT

[75] Inventor: Stephen M. Walters, Aberdeen, N.J.

[73] Assignee: Bell Telephone Laboratories, Incorporated, Murray Hill, N.J.

[21] Appl. No.: 203,794

[22] Filed: Nov. 3, 1980

[51] Int. Cl.[3] .............................................. G06F 3/04
[52] U.S. Cl. ................................... 364/200; 377/54; 377/77
[58] Field of Search ................................ 370/85, 100; 364/200 MS File, 900 MS File; 235/92 SH, 92 PB, 92 CC; 377/44, 54, 64, 66, 77

[56] References Cited

U.S. PATENT DOCUMENTS

| 3,680,057 | 7/1972 | Blessin et al. | 364/200 |
| 3,970,997 | 7/1976 | Daly et al. | 364/200 |
| 4,006,465 | 2/1977 | Cross et al. | 364/200 |
| 4,034,346 | 7/1977 | Hostein | 364/200 |
| 4,048,673 | 9/1977 | Hendrie et al. | 364/200 |
| 4,065,810 | 12/1977 | Cramer et al. | 364/200 |
| 4,112,490 | 9/1978 | Pohlman et al. | 364/200 |
| 4,208,724 | 6/1980 | Rattlingourd | 364/900 |
| 4,231,084 | 10/1980 | Yoshizaki et al. | 364/200 |

OTHER PUBLICATIONS

ISSCC '80-Proceedings, 2/13/80, "A Digital Signal Processor for Telecommunications Applications", pp. 44-45.
ICASSP '80-Proceedings, vol. 1 of 3, "An LSI Digital Signal Processor", pp. 383-385, 4/9/80.
ICC '80-Proceedings, vol. 1 of 3, May 1980 "An Integrated Digital Signal Processor", pp. 11.1.1-11.1.5.
ICCC '80-Proceedings, vol. 2 of 2, Oct. 1, 1980, "Logic and Fault Simulations of the DSP, A VLSI Digital Signal Processor", pp. 948-952.

Primary Examiner—Eddie P. Chan
Attorney, Agent, or Firm—Richard B. Havill

[57] ABSTRACT

A data control circuit (18) for an input/output arrangement is arranged for controlling the transfer of a data word through a shift register (20 or 120) to or from a peripheral device (22 or 122). The circuit (18) provides for selection between internal clock generation at one of several rates or application of an external clock and for selection of the length and format of the data words to be transferred. Selection is accomplished by an interval counter (38), format data stored in a control register (37), two gating circuits (30 and 40) and a selection circuit (35).

5 Claims, 10 Drawing Figures

FIG. 2
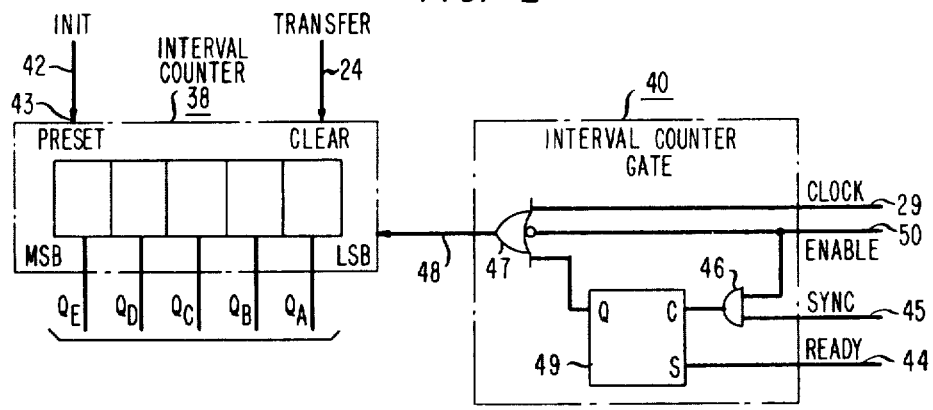
FIG. 4
SHIFT REGISTER GATE ENABLING
| CONTROL WORD | | | DISABLING STATE COMBINATIONS | SECOND COUNT STATE |
|---|---|---|---|---|
| X | FI | F0 | | |
| 0 | 0 | 0 | 0 | 00001 |
| 0 | 0 | 1 | 0,1 | 00010 |
| 0 | 1 | 0 | 0 | 00001 |
| 0 | 1 | 1 | 0,1 | 00010 |
| 1 | 0 | 0 | 0 | 00001 |
| 1 | 0 | 1 | 0,1 | 00010 |
| 1 | 1 | 0 | NONE | 00000 |
| 1 | 1 | 1 | 0 | 00001 |
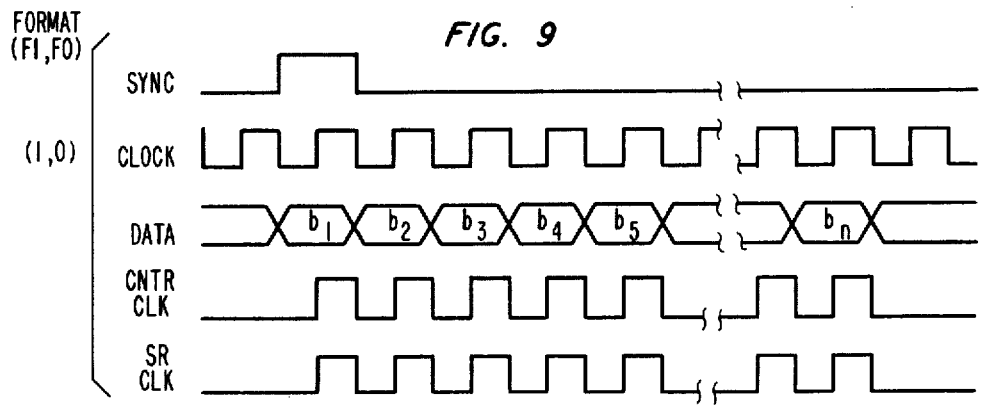
FIG. 9

FIG. 6

FORMAT/LENGTH SELECTION

| CONTROL WORD<br>X $L_1$ $L_0$ $F_1$ $F_0$ | SELECTOR CODE | COUNTER STATE REQUIRED |
|---|---|---|
| 0 0 0 0 0 | 0 | 9 |
| 0 0 0 0 1 | 1 | 10 |
| 0 0 0 1 0 | 2 | 9 |
| 0 0 0 1 1 | 3 | 10 |
| 0 0 1 0 0 | 4 | 17 |
| 0 0 1 0 1 | 5 | 18 |
| 0 0 1 1 0 | 6 | 17 |
| 0 0 1 1 1 | 7 | 18 |
| 0 1 0 0 0 | 8 | — |
| 0 1 0 0 1 | 9 | — |
| 0 1 0 1 0 | 10 | — |
| 0 1 0 1 1 | 11 | — |
| 0 1 1 0 0 | 12 | 21 |
| 0 1 1 0 1 | 13 | 22 |
| 0 1 1 1 0 | 14 | 21 |
| 0 1 1 1 1 | 15 | 22 |
| 1 0 0 0 0 | 16 | 8 |
| 1 0 0 0 1 | 17 | 9 |
| 1 0 0 1 0 | 18 | 8 |
| 1 0 0 1 1 | 19 | 9 |
| 1 0 1 0 0 | 20 | 16 |
| 1 0 1 0 1 | 21 | 17 |
| 1 0 1 1 0 | 22 | 16 |
| 1 0 1 1 1 | 23 | 17 |
| 1 1 0 0 0 | 24 | — |
| 1 1 0 0 1 | 25 | — |
| 1 1 0 1 0 | 26 | — |
| 1 1 0 1 1 | 27 | — |
| 1 1 1 0 0 | 28 | 20 |
| 1 1 1 0 1 | 29 | 21 |
| 1 1 1 1 0 | 30 | 20 |
| 1 1 1 1 1 | 31 | 21 |

DATA CONTROL CIRCUIT

BACKGROUND OF THE INVENTION

The invention relates to a data control circuit which is described more particularly as a control circuit for a highly flexible serial input/output arrangement of a data procesor.

In the prior art, there is a telegraph type signal subchannel that utilizes control signals and decoding logic to select a baud rate, a word length, synchronous/asynchronous mode of operation, and a specific number of stop bits in each binary word transmitted serially between the subchannel and a terminal device. These control signals may be supplied by a communications controller under the control of a program from the data processor. Since the control signals are supplied by the data processor, they can be changed when it is desirable to change the baud rate, the word length, the mode of operation, or the number of stop bits.

To assure synchronization of the receiver, start and stop bits are included in the serial transmission of every data word. A problem of poor time efficiency arises for this arrangement because all transmitted words include start and stop bits which are transmitted in serial with the data word being transmitted. These start and stop bits reduce the time efficiency of transmission. Time efficiency for serial transmission of start and stop pulses is represented by an expression $$\frac{n}{n+2} \times 100,$$

where n equals the number of data bits per word, and the start and stop bits each has the same pulse width as every data bit.

The problem of poor time efficiency can be solved by transmitting clock and synchronization pulses in parallel channels separate from the channel carrying the data characters. This eliminates the time otherwise required for transmitting the start and stop bits during the transmission of every word. Time efficiency is improved because only the time for transmitting the basic data word is used. Time efficiency for parallel transmission of the start and stop pulses is 100 percent because no data transmission time is used for transmitting either start or stop bits.

SUMMARY OF THE INVENTION

Such transmission of clock and synchronization pulses concurrently with the data is used in the operation of a serial data input/output arrangement having a shift register and a data control circuit including an interval counter, means for applying clock pulses, and a control register for storing format data. A first signal is supplied to the interval counter for resetting the interval counter. First and second gate circuits are provided for controllably transmitting the clock pulses from the applying means to the interval counter and to the shift register, respectively. A selection circuit responds to the format data and to a first count state and subsequent sequential count states of the interval counter for producing a second signal to fully condition the first gate circuit for transmitting the clock pulses and for partially conditioning the second gate circuit for transmitting the clock pulses. A synchronization signal enables the fully conditioned first gate circuit to transmit the clock pulses to the interval counter and fully conditions the second gate circuit. The fully conditioned second gate circuit responds to the format data and a second count state and subsequent sequential count states of the interval counter for enabling transmission of the clock pulses to the shift register. The selection circuit responds to the format data and to a third count state of the interval counter for inverting the second signal and thereby disabling the first and second gate circuits from transmitting the clock pulses.

BRIEF DESCRIPTION OF THE DRAWINGS

The invention will be more fully understood from the following detailed description of an illustrative embodiment thereof when that description is read in conjunction with the attached drawing wherein

FIG. 2 is a combination of a block diagram of an interval counter and a logic schematic of an interval counter gate circuit;

FIG. 4 is a table, for the shift register gate of FIG. 3, of state combinations and second counter states;

FIG. 6 is a table, for the format/length selection circuit of FIG. 5, of selector codes and required interval counter states for various combinations of data stored in the control register;

FIG. 9 is a more specific series of waveforms used during the operation of the control circuit.

DETAILED DESCRIPTION

Figure 1:
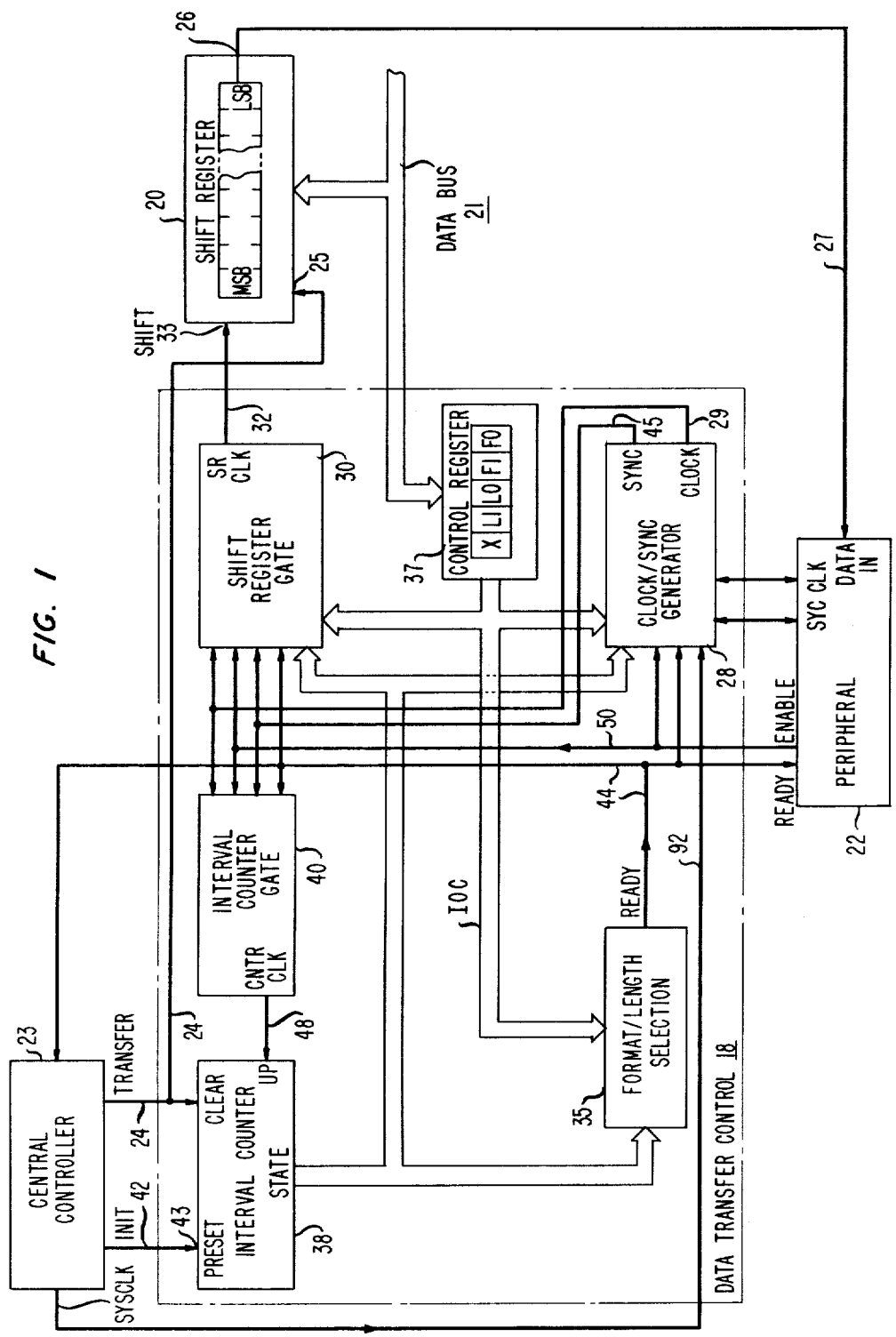
FIG. 1 is a block diagram of an output arrangement for controlling the transfer of a data word from a data bus through a shift register to a peripheral device.

Referring now to FIG. 1, there is shown a data transfer control circuit 18 and a shift register 20 that acts as a parallel to serial converter for a binary data word, residing in parallel on a twenty-bit wide data bus 21 of a processor and waiting to be transmitted in serial to a peripheral device 22. The shift register includes twenty input terminals, one for each stage of the shift register. Each input terminal is connected to one lead of the data bus which supplies the input data word. A TRANSFER signal from a central controller 23 is applied by way of a lead 24 and load terminal 25 of the shift register to all of the stages of the shift register. When the TRANSFER signal is applied to the shift register, it causes the bits of the data word present on the data bus 21 to be loaded all at once into the stages of the shift register 20. The least significant bit of the data word, which is stored in the rightmost stage LSB of the shift register, appears at a serial data output terminal 26 and is held there until a clock pulse is applied subsequently. The rest of the bits of the data word are stored in sequential order in the other stages of the shift register with the most significant bit being located in the leftmost stage MSB.

Clock pulses for shifting the data in the shift register emerge from the clock/sync generator 28 and are applied through a clock lead 29, a shift register gate 30, and a shift register clock lead 32 to the shift input 33 of the shift register 20. From there the clock pulses are distributed to all stages of the shift register. The data bits shifted from the data bus into the shift register are transferred from stage to stage in the shift register in response to a trailing edge of each clock pulse. Each clock pulse causes the data in the shift register to be shifted one stage to the right causing a new bit to be presented at the serial data output terminal 26. A data bit is considered to be transmitted to the connected peripheral device 22 when the trailing, or falling, edge of the clock pulse occurs. It is expected that the peripheral device 22 will latch the data bit when the rising edge of the clock pulse occurs since the data bit is stable at that time. Thus as the clock pulses are applied to the shift register, the bits of the data word are transmitted serially to the peripheral device.

The length of the data word to be transmitted, however, is selectable between eight bits, sixteen bits and twenty bits. Such length selection is accomplished by a format/length selection circuit 35 which operates in response to length data L1, L0 stored in a control register 37. For a typical system arrangement, the data transfer control circuit 18 and the shift register 20 are connected permanently with a specific peripheral devie 22 having a fixed word length. Length data L1, L0 therefore will remain unchanged during routine operation. At times a peripheral device having a different word length may replace peripheral device 22. At such times different length data L1, L0 is stored in the control register 37 prior to commencing a data word transfer operation.

The format/length selection circuit produces a READY signal for partially conditioning the shift register gate 30 in preparation for applying a selected number of clock pulses from the clock/sync generator 28 and the clock lead 29 to the shift register. The length data L1, L0 stored in the control register and representing the selected number of bits, or length of the data word stored in the shift register, determines the number of clock pulses to be applied to the shift register.

For any selected data word length shorter than the length of the shift register, the least significant bits are transmitted serially to the peripheral device in sequential order. All of the bits which are more significant than the number of bits to be transmitted remain in the shift register. Since only the least significant bits are transmitted, the user must assure that all of the data to be transmitted is included in those bits.

FIG. 1 also shows an interval counter 38 and an interval counter gate 40. The interval counter is connected with the central controller by way of the lead 24 which carries the TRANSFER signal and by way of lead 42 which carries an INIT pulse. Both the TRANSFER signal and the INIT pulse are active high. Their durations need only be long enough to preset or clear the interval counter. This arrangement of the interval counter and the interval counter gate is presented in greater detail in FIG. 2.

Referring now to FIG. 2, the interval counter 38 is a five-stage synchronous binary counter with asynchronous preset and clear. This counter changes state in response to the trailing edge of each applied clock pulse. As shown in FIG. 2, the least significant bit position LSB of the interval counter is at the right and the most significant bit position MSB is at the left.

To start up, or initialize, for transferring a data word from the data bus 21 of FIG. 1 through the shift register 20, the serial data output terminal 26, and lead 27 to the peripheral device 22, the INIT pulse on line 42 is applied to a preset terminal 43 and therethrough to each stage of the interval counter. The INIT pulse sets the interval counter to its all "1's" state. This state is applied to the format/length selection circuit 35, shown in FIG. 1, forcing its output READY signal on lead 44 to a high level, or "1". The READY signal being a "1" initializes both the interval counter gate 40 and the shift register gate 30, shown in FIG. 1, such that transmission of clock pulses is disabled to both the interval counter and the shift register. When the READY signal is a high level, it indicates that a transfer has been completed and that the shift register is prepared to commence a transfer of another data word to the peripheral device.

The central controller 23 senses the READY signal being high and changes the TRANSFER signal to high for loading another data word into the shift register. When the data word is loaded into the shift register by the TRANSFER signal on lead 24, the READY signal goes to zero. The TRANSFER signal clears the interval counter to a first count state, i.e., an all "0's" state, regardless of the state of the interval counter when the TRANSFER signal is applied. Since the state of the interval counter is changed from the all "1's" state to the all "0's" state, the format/length selection circuit of FIG. 1 changes the READY signal to a low level, or zero, thereby conditioning the interval counter gate 40 and partially conditioning the shift register gate 30 for transmitting clock pulses to the interval counter and the shift register, respectively. The READY signal going to a low level indicates the start of the transfer of the data word. Operation of the format/length selection circuit is discussed in greater detail hereinafter with respect to FIG. 5.

As shown in FIGS. 1 and 2, the interval counter gate 40 controls transfer of pulses from the clock lead 29 to the interval counter 38. This gate 40 is a sequential logic circuit including an output control OR gate 47 together with an AND gate 46 and a SET CLEAR (SC) flip-flop 49 for controlling the output OR gate 47. The output OR gate 47 disables transmission of clock pulses when an ENABLE signal on a lead 50 is a "0" or when the output Q of the SC flip-flop 49 is a "1".

The ENABLE signal is originated by the peripheral device. It has a high level to enable a transfer. If the ENABLE signal is low, it defers a transfer. If it is high at the beginning of a transfer and goes low during the transfer, it interrupts the transfer allowing for later completion of the transfer.

The SC flip-flop is set to a state producing a "1" at its output Q when a "1" is applied by the READY signal to its input S. Additionally, the SC flip-flop is cleared producing a "0" on output Q when a "1" is applied by the AND gate 46 to its input C. It is noted that a "1", applied on input S, overrides a "1" applied on input C. Thus when a "1" is applied to the input S, output Q equals "1" no matter what input is applied to input C.

During operation the READY signal on the lead 44 initially is a "1" forcing the flip-flop 49 to be set producing output Q equal to "1". Output Q being a "1" disables the transfer of clock pulses through the interval counter gate 40 to the interval counter 38, as previously mentioned.

When the data word is loaded into the shift register by the TRANSFER signal and the READY signal goes to zero commencing the transfer of the data word, the flip-flop 49 retains the same state inhibiting transmission of clock pulses to the interval counter as long as the signal from the AND gate 46 remains a zero; however, the flip-flop is in condition to be reset because a "1" no longer is applied to its input S. Thus the interval counter gate is fully conditioned to transmit clock pulses.

The fully conditioned interval counter gate is enabled by a synchronization (SYNC) signal that is applied from the clock/sync generator 28 by way of a lead 45. The SYNC signal clears the flip-flop 49 provided the ENABLE signal is a "1". When the ENABLE signal is a "1" at the time the SYNC signal arrives, the AND gate 46 produces a "1" output clearing the flip-flop 49. Its output Q changes to "0" enabling the output OR gate 47 to transmit subsequent clock pulses from the lead 29 to the interval counter 38. Once the interval counter gate thus is enabled, subsequent clock pulses are transmitted from the lead 29 through the output OR gate 47 and a lead 48 to the interval counter which counts up through successive binary states.

The clock pulses on lead 48 are distributed to all stages of the interval counter. Clock pulses can be interrupted at the output OR gate 47 if the ENABLE signal from the peripheral device is changed to a "0".

While the interval counter is counting through the successive states, one of them is used by the fully conditioned shift register gate for enabling transmission of the clock pulses to the shift register. More specifically a selected second count state of the interval counter and subsequent sequential count states of the interval counter enable transmission of the clock pulses to the shift register. Selection of the second count state is to be described hereinafter. The clock pulses are distributed to all of the stages of the shift register. In response to each clock pulse, the shift register shifts the data word serially one stage along the register thereby transferring the data word serially through the serial data output terminal 26 and lead 27 to the peripheral device 22.

This transmission of the clock pulses to the shift register continues until the entire data word is transferred through the shift register and out to the peripheral device.

At the same time clock pulses continue to be transmitted through the interval counter gate to the interval counter until the READY signal on lead 44 changes to a "1" indicating the end of the transfer of a single data word.

The READY signal is changed back to a "1" by the format/length selection circuit when a selected third count state of the interval counter occurs. The selected third count state is determined by the control word stored in the control register 37 and applied to the format/length selection circuit 35, to be described in detail hereinafter. As previously mentioned, this causes the flip-flop 49 of FIG. 2 to be set making its output Q a "1". As a result, the output Q of the flip-flop 49 disables the output OR gate 47 from transmitting any more clock pulses to the interval counter. The interval counter thereafter remains in this third, or final, count state until another data word is to be transferred through the shift register to the peripheral device.

Figure 3:
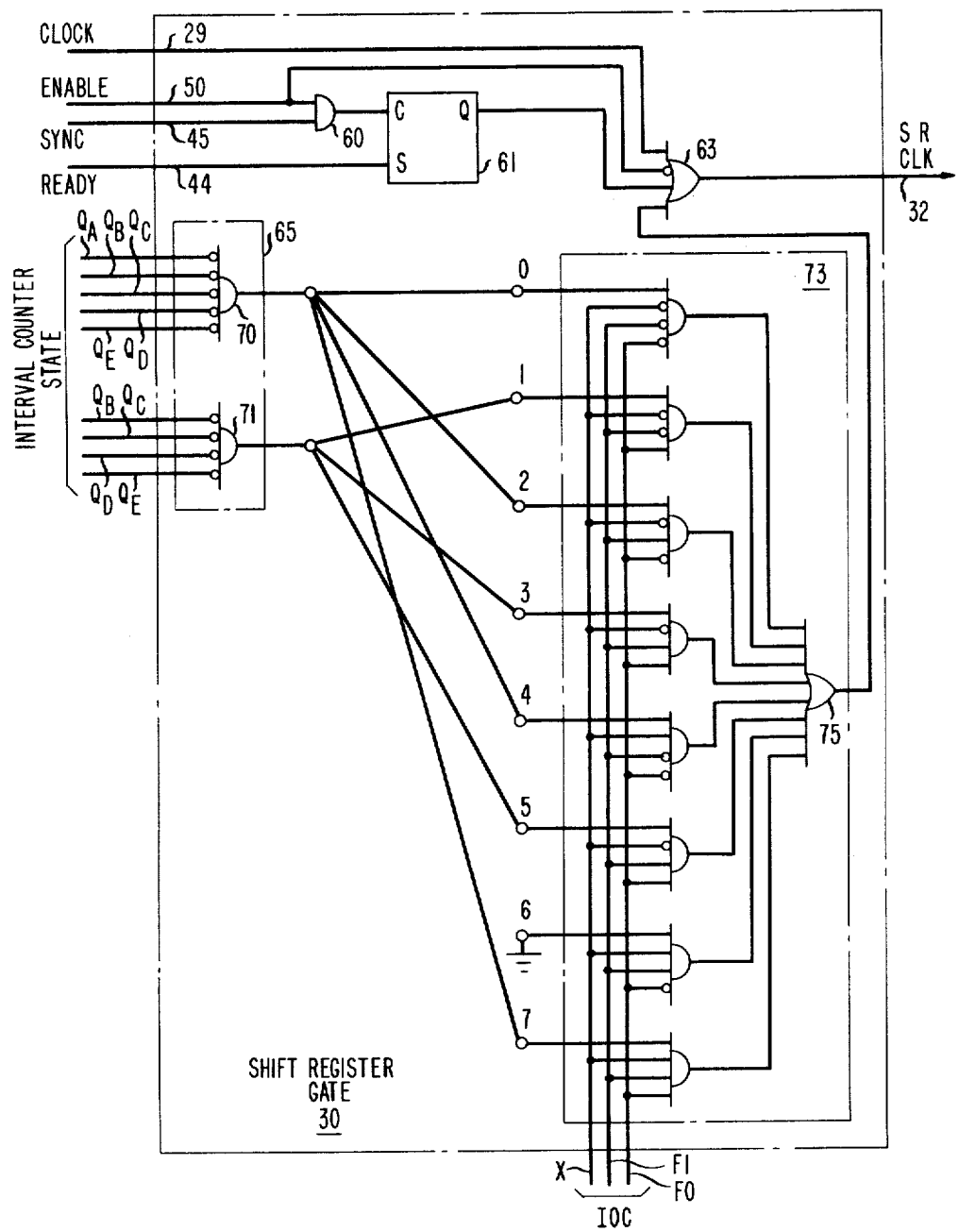
FIG. 3 is a logic schematic of a shift register gate circuit.

Referring now to FIG. 3, there is shown the shift register gate 30 which is arranged for controllably transmitting clock pulses from the clock/sync generator 28 to the shift register 20, as shown in FIG. 1. This shift register gate 30 selectively suppresses transmission to the shift register of early clock pulses of the group of clock pulses accompanying the data word depending upon the format data X, F1 and F0 included in the control word stored in the control register 37.

As shown in FIG. 4, when the format data X, F1, F0 are (1,1,0) the clock/sync generator 28 eliminates, or suppresses, none of the clock pulses. When the format data are either (0,0,0), (0,1,0), (1,0,0) or (1,1,1) the clock/sync generator suppresses one of the clock pulses. When the format data are either (0,0,1), (0,1,1) or (1,0,1) the clock/sync generator suppresses two clock pulses.

In FIG. 3 AND gate 60 and SC flip-flop 61 of the shift register gate 30 are arranged for conditioning an output OR gate 63 for enabling transmission of the clock pulses to the shift register. This portion of the shift register gate 30 is similar to the previously described interval counter gate shown in FIG. 2. The READY signal on lead 44 partially conditions the output OR gate 63 by changing to "0" after the flip-flop 61 has been set. The high SYNC signal on lead 45 in concurrence with the high ENABLE signal on lead 50 fully conditions the output OR gate 63 by clearing the flip-flop 61 to produce a zero from output Q. When the shift register gate 30 thus is fully conditioned to transmit clock pulses, it will transmit them depending upon the state of the interval counter and the high ENABLE signal being on lead 50.

The shift register gate also includes a decoder 65 for detecting various states of the interval counter. The specific decoder shown in FIG. 3 is arranged with two AND gates 70 and 71. AND gate 70 produces a "1" only when the interval counter is in the count state 00000 wherein the leftmost "0" represents the most significant bit. AND gate 71 produces a "1" only when the interval counter is in the count states 00000 or 00001. Interval counter state 00000 concurs with the SYNC signal. Otherwise the outputs of the decoder 65 are "0's".

These outputs of the decoder are applied as inputs to a selection circuit 73 which produces an output signal from an OR gate 75. When that output signal is a zero, it enables the output OR gate 63. When the selection circuit 73 selects a decoder 65 output while that output is a "1", the OR gate 63 is disabled from transmitting clock pulses. The states of the interval counter which are selected to cause the output OR gate 63 to produce a "1" for disabling transmission of the clock signal to the shift register are determined by the control word bits X, F1 and F0 that are stored in the control register and are applied to the selection circuit 73 by way of the bus IOC.

Referring once again to FIG. 4, there is shown a table presenting control words together with disabling state combinations and the second count states. When the interval counter is in any count state which is a count state included within the selected disabling state combinations determined by the control word, one of the AND gates 70 and 71 produces a "1" and the output OR gate 63 is disabled. Thus transmission of a clock pulse to the shift register and transfer of a bit of the data word to the peripheral device can be disabled in concurrence with the SYNC signal and for the next subsequent clock cycle or two. Conversely, the output OR gate 63 is enabled whenever the interval counter is in a count state that is not one of the disabling count states specified by the format data thereby causing both AND gates 70 and 71 to produce "0's". Once the output OR gate 63 is enabled during the second count state, subsequent clock pulses on lead 29 are transmitted through that gate to the shift register 20 for shifting data in serial through the shift register. This operation continues for each subsequent clock pulse and its associated count state of the interval counter. Transmission of the clock pulses from lead 29 to the shift register continues until the READY signal changes to a "1", as determined by the format/length selection circuit 35 to be described with respect to FIG. 5.

Figure 5:
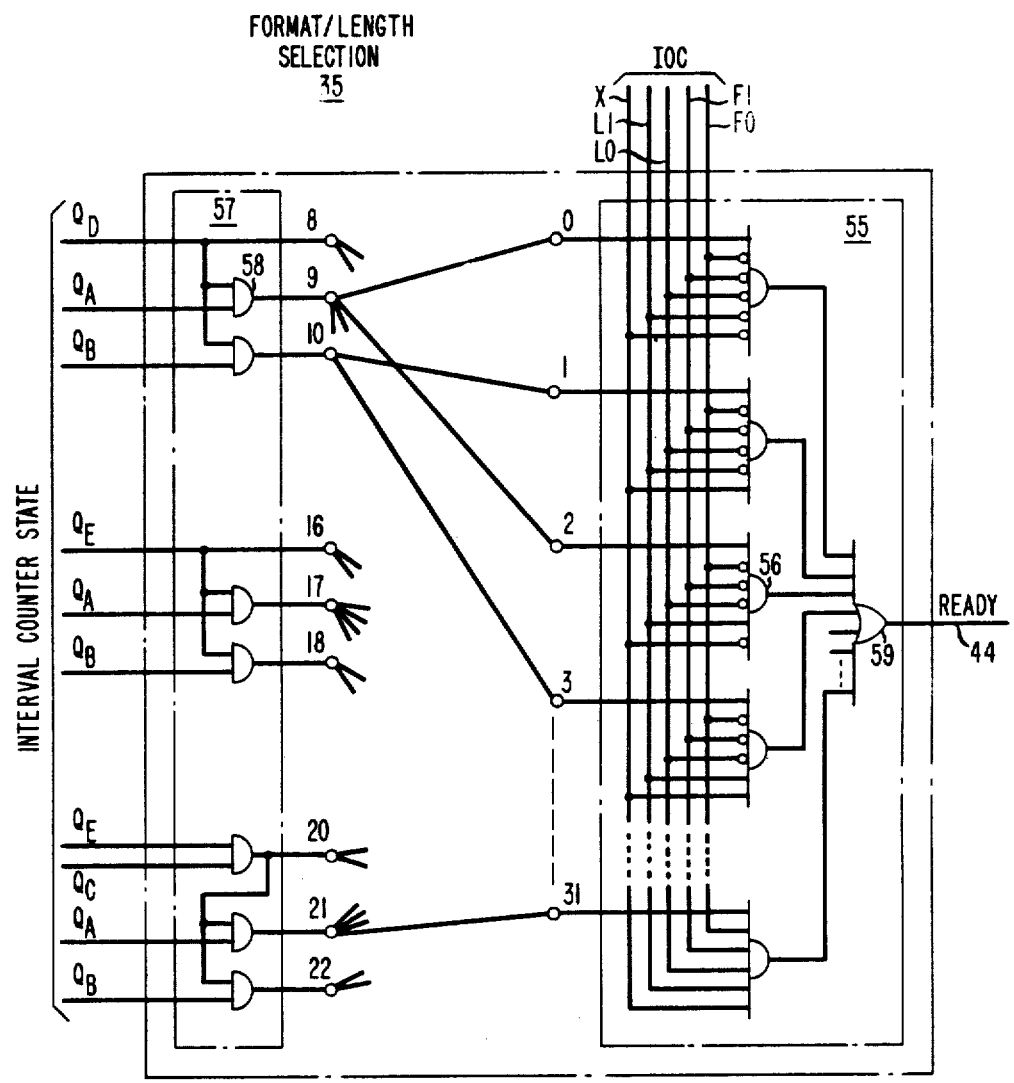
FIG. 5 is a logic schematic of a format/length selection circuit.

Referring now to FIG. 5, there is shown a format/length selection circuit 35 that includes both counter state decoding and selection logic circuits which cooperate in producing the READY signal for conditioning the interval counter gate and for partially conditioning the shift register gate. At any time the state of the READY signal on output lead 44 is determined by the state of the interval counter and by the control word stored in the control register 37 of FIG. 1 and applied through a bus IOC to the format/length selection circuit. This selection circuit assures that the READY signal goes to zero for the first count state 00000 and stays at zero until the selected third count state occurs. The control word stored in the control register 37 selects the third count state by selecting one of the state values decoded by the state decoder 57. In effect this selection circuit determines when the last clock pulse is applied to the shift register and interval counter for transferring the data word to the peripheral device.

As shown in FIG. 6, any one of several possible control words is stored in the control register 37 before commencing any data word transfer. This control word includes three parts for determining selections for operating the control circuit of FIG. 1. A bit X is a "0" to indicate that the clock pulses and SYNC signal originate at the clock/sync generator 28 and is a "1" to indicate that the clock pulses and SYNC signal originate at the peripheral device 22. The selected third count state is dependent upon the state of bit X as well as other bits. Two bits L1 and L0 are used for selecting the length of the data word to be transmitted. The selectable data word lengths are 8, 16 and 20 bits which are selected by L1, L0 being (0,0), (0,1) and (1,1), respectively. Two additional bits F1 and F0 are format bits which together with bit X determine whether 0, 1 or 2 clock pulses are transmitted to the interval counter and the peripheral device preceding the clock pulses which are transmitted to them as well as to the shift register for transferring the data word, as previously described.

In FIG. 5, the format/length selection circuit includes a selection circuit 55 that is responsive to the control word stored in the control register 37. A group of AND gates have their inputs, which are applied from the control register, arranged so that each distinct combination of bits from the control register prepares one gate, such as gate 56, to pass an output of the interval counter state decoder 57, such as from AND gate 58 for decoding counter state 9, to an output OR gate 59. Whatever is the condition of the output of the AND gate 58 is transmitted through the AND gate 56 and the OR gate 59 to produce the READY signal on lead 44.

When the interval counter initially is preset to its all ones state, the READY signal is a "1" because all of the AND gates in the decoder circuit 57 produce "1's" at their outputs. One of these "1's" will be transmitted to the lead 44 by way of the selection circuit 55. Whichever one of the AND gates of the selection circuit 55 is selected passes a "1" from the decoder to the lead 44 as the READY signal.

When a transfer of a data word commences in response to the TRANSFER signal, the interval counter is put into its first count state 00000, as previously described. This state causes all outputs of the decoder circuit 57 to produce "0's". Because of the logic in the selection circuit 55, the output OR gate 59 has all zero input signals. Whichever one of the AND gates of the selection circuit 55 is selected passes a zero from the decoder to the lead 44 as the READY signal.

Thus the READY signal is a "0" fully conditioning the interval counter gate and partially conditioning the shift register gate for transmitting clock pulses. The READY signal being "0" removes the set signal from the flip-flop 49 of FIG. 2 fully conditioning the interval counter gate for transmitting clock pulses to the interval counter. Likewise the set signal is removed from the flip-flop 61 of FIG. 3 partially conditioning the shift register gate for transmitting clock pulses.

Once the READY signal goes to zero, transmission of the clock pulses through lead 48 of FIGS. 1 and 2 to the interval counter commences, and the interval counter increments through several states during which the outputs of the decoder 57 in FIG. 5 all remain at "0's". When the interval counter gate commences transmitting the clock pulses to the interval counter, the shift register gate 30 disables transmission of 0, 1 or 2 clock pulses to the shift register depending upon the state of bits X, F1 and F0, respectively of the control word. When the second count state occurs, clock pulses are transmitted through the shift register gate to the shift register causing transfer of the data word for several clock pulses. Finally the interval counter is incremented into the third count state, for example count state 01001 (or 9), which causes AND gate 58 to produce a "1". All other AND gate outputs of the decoder circuit 57 remain at "0's". The "1" produced by AND gate 58 is transmitted through the selected AND gate 56 and the OR gate 59 to invert the READY signal to a "1". This condition of the READY signal sets the flip-flop 49 in FIG. 2 and the flip-flop 61 in FIG. 3. The setting of those flip-flops disables the transmission of clock pulses through the interval counter gate 40 and the shift register gate 30. Thus the transfer of the data word to the peripheral device 22 of FIG. 1 is terminated.

It is noted that the shift register gate 30 of FIG. 3 and the format/length selection circuit 35 of FIG. 5 are shown in a basic logic form. For operation in any specific system the logic circuits may be reduced by known logic reduction methods.

FIG. 6 is a truth table representing the logic implemented in the format/length selection circuit 35 of one useful system.

Figure 7:
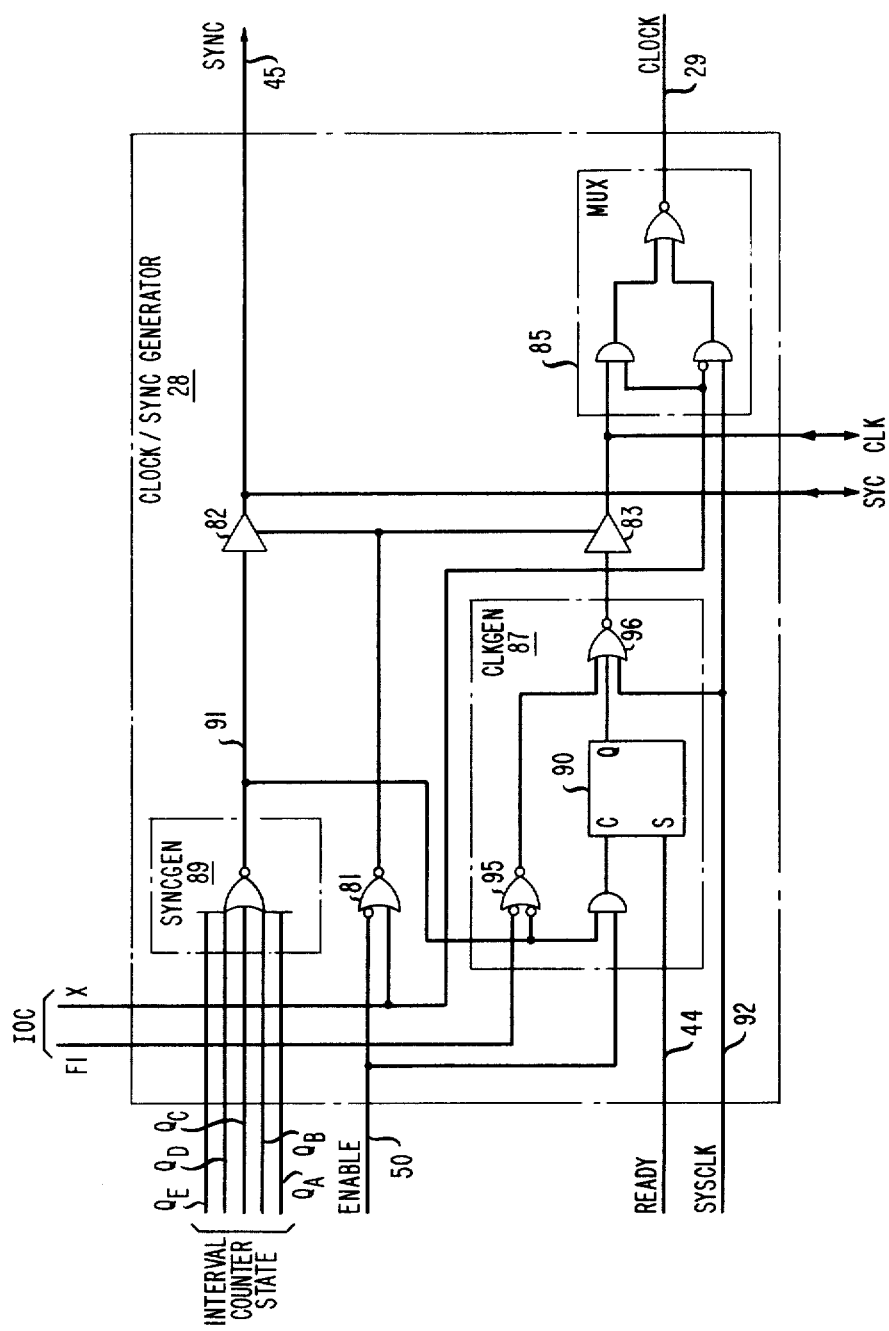
FIG. 7 is a logic schematic of a controlled clock pulse and synchronization signal generator.

Referring now to FIG. 7, there is shown the clock/sync generator 28 which is arranged to select either one of two sources of the clock pulses and the SYNC signal. As an active source the clock/sync generator 28 itself applies the clock pulses and the SYNC signal to both the peripheral device 22 and the data control circuit 18. When the clock/sync generator acts as a passive source of the clock pulses and the SYNC signal, the peripheral device 22 generates the clock pulses and the SYNC signal which pass from the peripheral device through the clock/sync generator 28 to be applied to other parts of the data transfer control circuit 18.

Data on lead X from the control register 37 determines whether the clock pulses and the SYNC signal are either active, i.e., generated by this circuit 28, or passive, i.e., generated by the peripheral device. When the signal on lead X is low, the clock/sync generator 28 is active. When the signal on lead X is high, the clock/sync generator is passive.

In the passive mode, gate 81 produces a low level output which disables gate 82 thereby permitting the SYNC signal on lead SYC to pass from the peripheral device to the lead 45 of the data transfer control circuit 18. The low signal from gate 81 also disables gate 83 permitting clock pulses on lead CLK to pass from the peripheral device to a multiplexer (MUX) 85. The high level on lead X causes the MUX 85 to select its input from the lead CLK for application to the lead 29 of the data transfer control circuit 18.

In this passive mode, the peripheral device provides both the clock pulses and the SYNC signal. Each SYNC signal is used to indicate the start of the transfer of a data word. A data transfer will occur at any time that the synchronization signal on the lead SYC is a high level providing that the READY signal on lead 44 is low and the ENABLE signal on lead 50 is "1". Once a data transfer has begun, the peripheral device 22 must provide clock pulses on the lead CLK to advance data through the shift register 20 and serially out to the peripheral device. These clock pulses are transmitted through the MUX 85 and the clock lead 29 to the various parts of the data control circuit 18. The clock pulses can be either continuous in nature or a burst of pulses accompanying a single data word.

In the active mode, lead X is held at a low level. While the ENABLE signal on lead 50 is high during the active mode, gate 81 produces a high level output which enables gate 82 to transmit active SYNC signals produced by a SYNCGEN gate 89. As previously mentioned when a data transfer is to take place, the TRANSFER signal on the lead 24 in FIG. 1 causes the interval counter 38 to be cleared to its all "0's" state. This first, or all "0's", count state causes the SYNCGEN gate 89 to produce a high output. This high level signal is an active SYNC signal which is supplied through the gate 82 and the SYNC lead 45 to the interval counter gate to enable it. This active SYNC signal also is transmitted through gate 82 and the lead SYC to the peripheral device. The high level from gate 81 also enables gate 83 permitting active clock pulses from a CLKGEN gate 87 to be transmitted by way of the gate 83 and the lead CLK to the peripheral device 22. The low level on lead X causes the MUX 85 to select SYSCLK clock pulses from lead 92 for application through the clock lead 29 to other sections of the data transfer control circuit 18. The SYSCLK clock pulses are clock pulses produced by the central controller 23. Clock pulses on the clock lead 29 are applied through the interval counter gate 40 of FIG. 1 to the interval counter 38 for incrementing it. When the interval counter advances to its state 00001, the output of the SYNCGEN gate 89 goes low and remains low for all subsequent states of the interval counter during the transfer of the remainder of one data word and thereafter until the TRANSFER signal on the lead 24 clears the interval counter again.

In this active mode, the peripheral device receives clock pulses on the lead CLK and the SYNC signal on the lead SYC and is expected to refrain from transmitting any signals over those leads.

In the active mode, the CLKGEN gate 87 produces a burst of clock pulses which are transmitted through the gate 83 and the lead CLK to the peripheral device 22. Prior to commencing a transfer of data, the READY signal on lead 44 is at a high level, which causes an SC flip-flop 90 to be set. The flip-flop 90 produces a "1" from its output Q disabling the output from the CLKGEN gate 87 from transmitting SYSCLK pulses from the lead 92 to the lead CLK. When a data word transfer commences, the READY signal on lead 44 goes low removing the held set signal from the flip-flop 90. The flip-flop, however, remains set until the ENABLE signal on the lead 50 is high when the SYNCGEN gate 89 output signal on the lead 91 goes high. At that time the flip-flop 90 is cleared producing a "0" from its output Q and thereby enabling SYSCLK pulses from lead 92 through the output NOR gate 96 until the READY signal on lead 44 goes high.

The format selection circuit controls whether or not a SYSCLK clock pulse concurrent with the active SYNC pulse is permitted to be transmitted from the lead 92 to the peripheral device. This depends upon the format selected by way of the lead F1.

When the signal on lead F1 is a "0", gate 95 produces a "0" allowing the SYSCLK clock pulses on lead 92 to be transmitted by the CLKGEN gate 87. The SYSCLK clock pulses commence with the SYNC signal and a burst of clock pulses continues until the data word transfer is complete. At that time the READY signal on the lead 44 goes high setting the flip-flop 90 and changing its output Q to "1". This "1" disables transmission of the SYSCLK clock pulses from the lead 92 to the output of the CLKGEN gate 87. This terminates the transfer of the data word.

When the signal on lead F1 is "1", gate 95 transmits to its output the active SYNC signal from the SYNCGEN gate 89. This action prevents SYSCLK clock pulses on the lead 92 from reaching the output of the CLKGEN gate 87 when the active SYNC signal is high. This eliminates a clock pulse which otherwise would be concurrent with the active SYNC pulse. After the first SYSCLK clock pulse is thus eliminated, the following SYSCLK clock pulses on lead 92 are transmitted through the CLKGEN gate 87 as a burst of pulses which are applied through MUX 85 and lead 29 to the shift register 30 of FIG. 1 for transferring the data word to the peripheral device 22.

Figure 8:
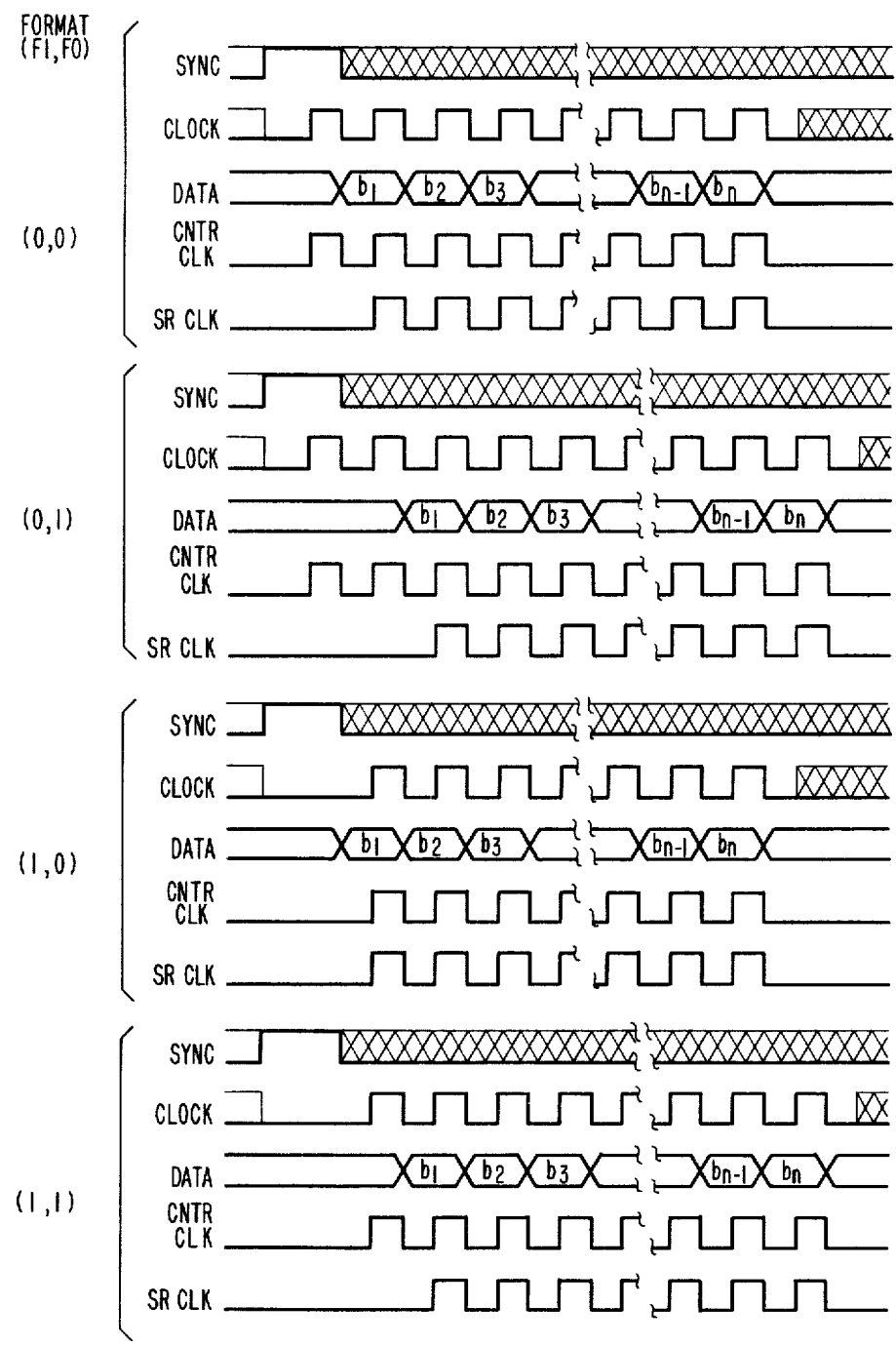
FIG. 8 is four groups of a series of waveforms used during the operation of the control circuit.

Referring now to FIG. 8, there is shown four groups of signal waveforms that may occur during operation of the data transfer control circuit. In FIG. 8, each of the four groups of waveforms represents a transfer of data for a different transmission format which is identified by the format data bits F1 and F0, shown at the left of each group of waveforms. Each format shows waveforms for both active and passive modes of clock pulses and SYNC signal generation. All of the waveforms shown in FIG. 8 can be used for passive mode operation. Waveforms specifically generated for the active mode are shown as heavily emphasized lines in FIG. 8.

In the active mode for format (0,0), a transfer operation starts after the SYNC signal goes high, as shown in the emphasized group of waveforms at the top of FIG. 8. Both the CLOCK pulses on lead 29 and interval counter clock pulses (CNTR CLK) on lead 48 commence by going high while the SYNC signal is high and have a trailing edge concurrent with the trailing edge of the SYNC signal. Shift register clock pulses (SR CLK) on lead 32 commence one clock cycle later. The first shift register clock pulse causes the first, or least significant, bit $b_1$ of data to be transferred out of the shift register. For shifting bits $b_1$ through $b_n$, the bits of a single data word, n shift register clock pulses are used.

It is noted that for format (0,0) a clock pulse occurs while the SYNC signal is high and that the data word transfer commences with the clock pulses immediately following the trailing edge of the SYNC signal.

For the active mode in the format (0,1), the waveforms for operation are much like the foregoing format, however, it is noted that the shift register clock pulses and the data word transfer are initiated two clock cycles after the trailing edge of the SYNC signal.

For the active mode in the formats (1,0) and (1,1), the waveforms are much like the waveforms for formats (0,0) and (0,1), respectively, except that in each instance the first clock pulse and the first interval counter clock pulse occurs one clock cycle after the trailing edge of the SYNC signal.

Additionally it is noted that for each format the correct number of shift register clock pulses and interval counter clock pulses are applied for transferring n bits of the data word. The user can determine which of the formats is suited to the desired application and select that format by storing the appropriate format code in the control register 37 of FIG. 1.

For passive mode operation, the user can operate with waveforms similar to those just described with respect to active mode operation. Additionally, in the passive mode, other waveforms may also be used. These other waveforms are represented by the unemphasized portions of the waveforms of FIG. 8.

One specific difference is that the SYNC signal need not have any particular overlap relationship with the clock pulses. In fact, the SYNC signal can be continuously high. Transfer of a data word is initiated when the central controller 23 transmits a TRANSFER signal while the ENABLE signal is high. The clock pulses produced by the peripheral device can be either a continuous clock stream or a burst of clock pulses accompanying each data word to be transferred. For each data word transfer, the first clock pulse commences when the SYNC signal and the ENABLE signal are high. The circuit begins clocking the first time thereafter that the clock signal is low.

Referring now to FIG. 9, there is shown the waveforms for a particular manner of operating in the passive mode with format (1,0). The salient feature of this manner of operation is that the first data bit is transferred in response to a clock pulse that concurs with the SYNC signal. With this manner of operation, a bit of the data word is transferred every clock cycle achieving one hundred percent time efficiency for the transfer.

Figure 10:
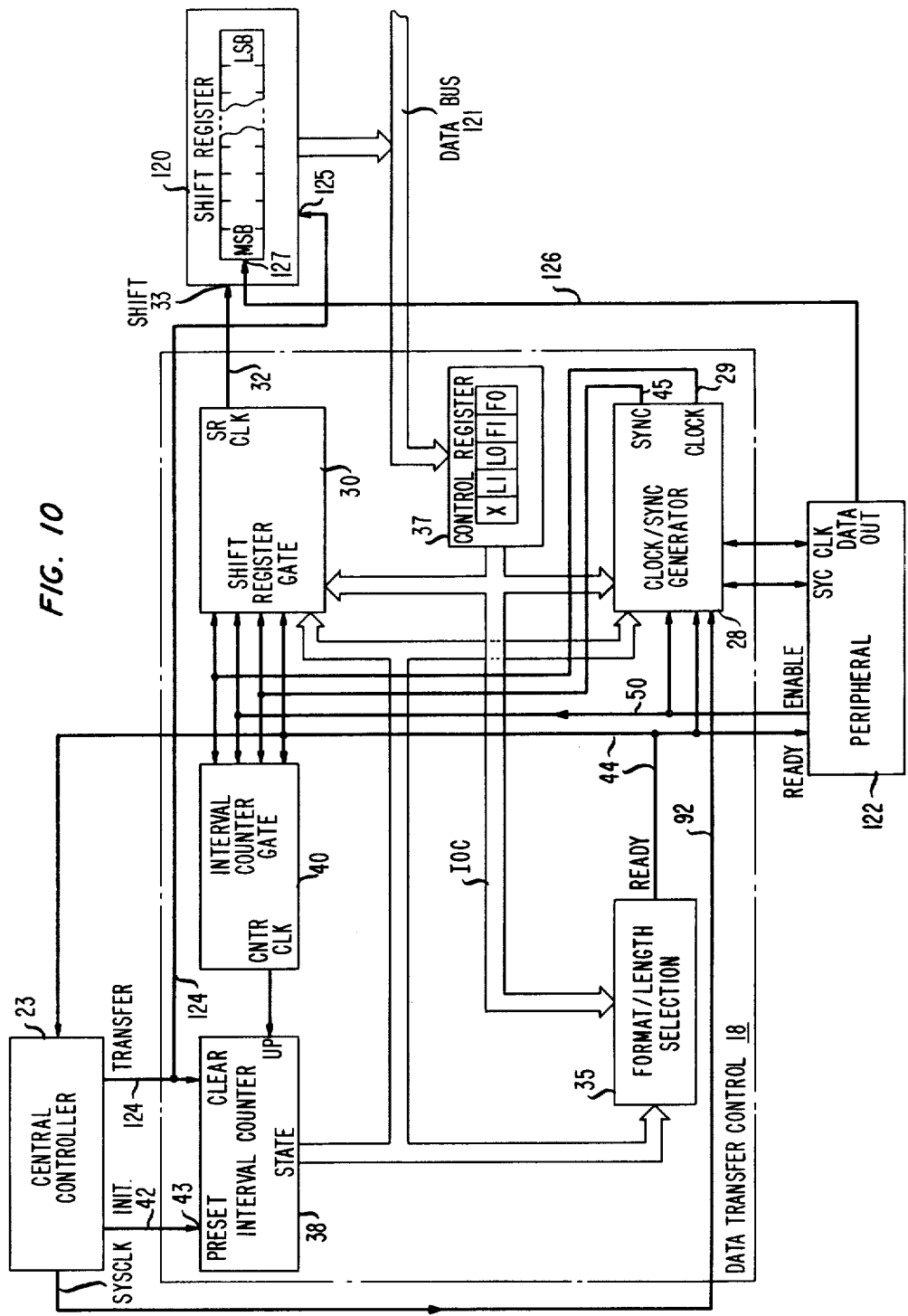
FIG. 10 is a block diagram of an input arrangement for controlling the transfer of a data word from a peripheral device through a shift register to a data bus.

Referring now to FIG. 10, there is shown the data control circuit 18 together with a shift register 120 that acts as a serial to parallel converter for a binary data word, residing in a peripheral device 122 and waiting to be transferred in serial form from the peripheral device and to be received by the shift register. Thereafter it is further transferred in parallel from the shift register to a twenty-bit wide processor data bus 121. The binary data word is shifted serially from the peripheral device through a lead 126 to a serial input terminal 127 of the shift register at the most significant bit position (MSB).

Clock pulses from the clock/sync generator 28 are applied through the lead 29, the shift register gate 30 and the clock lead 32 to the stages of the shift register. The data bits from the peripheral device 122 are shifted one bit at a time into the most significant bit (MSB) stage of the shift register. The least significant bit which is the first of the sequence of bits of the data word, transfers from stage to stage within the shift register in response to each clock pulse. Each clock pulse causes all of the data then residing in the shift register to shift one stage to the right.

In this receive mode as in the previously described transmit mode, the length of the data word to be received is selectable from among 8 bit, 16 bit and 20 bit word lengths. Length selection is made by the format/selection circuit 35 under control of the control word stored in the control register 37. The READY signal on lead 44 conditions the shift register gate 30 to apply the selected number of clock pulses from the clock/sync generator 28 to the shift register. Accordingly, the selected number of bits from the peripheral device are received into the shift register. The shift register includes twenty output terminals, one for each stage of the shift register. Each output terminal is connected to one lead of the data bus which receives the data word for further transfer to some destination in the processor, not shown.

For receiving data from the peripheral device, the transfer control circuit 18 operates similar to its operation of transferring a data word to the peripheral. Differences which occur in the receive transfer occur because of some difference interconnections between the data transfer control circuit 18 and the shift register 120. To initialize for transferring a data word from the peripheral 122 through the shift register 120 to the data bus 121, the INIT pulse on line 42 is applied to the preset terminal 43 and therethrough to each stage of the interval counter setting the interval counter to its all "1's" state. This state is applied to the format/length selection circuit 35 forcing the READY signal to a "1". This high level of the READY signal initializes both the interval counter gate 40 and the shift register gate 30 to disable transmission of clock pulses to both the interval counter and the shift register. When the READY signal is at this high level, it indicates that a transfer has been completed and that the shift register 120 is prepared to commence a transfer of the data word from the shift register device to the data bus.

Thereafter the TRANSFER signal from the central controller 23 is applied by way of a lead 124 and a read terminal 125 of the shift register to all stages of the shift register. This transfer signal reads a data word out of the shift register onto the data bus 121.

The TRANSFER signal also clears the interval counter to the first count state, i.e., the all "0's" state thereby fully conditioning the interval counter gate 40 and partially conditioning the shift register gate 30 for applying clock pulses to the interval counter and the shift register, respectively. These clock pulses cause the transfer of another data word from the peripheral device to be received by the shift register 120. A data bit is considered to be received from the connected peripheral device 122 when the trailing edge of the clock pulse occurs. It is expected that the shift register 120 will latch the data bit when the rising edge of the clock pulse occurs while the data bit is stable.

Interval counter gate 40 again controls the transfer of clock pulses from the clock lead 29 to the interval counter. Transmission of the clock pulses to the shift register commences with a selected second count state and continues until all bits of the data word are transferred from the peripheral device into the shift register. At that time the interval counter reaches a selected third count state which causes the format/length selection circuit to change the READY signal to a "1" signifying the end of the word being transferred into the shift register.

For any selected word length shorter than the length of the shift register, the most significant bit positions of the shift register are filled with good data. Some of the least significant stages of the shift register will contain irrelevant data for such short word transfers.

After all of the selected number of clock pulses have been applied to the shift register and the peripheral device in accordance with the previous description relating to a transfer to the peripheral device, the READY signal goes high indicating the end of a transfer. Subsequently the TRANSFER signal again is applied by way of lead 124 and the read terminal of the shift register to all of the stages of the shift register. The data bits stored in all 20 stages of the shift register are transferred immediately in parallel to the leads of the data bus. Since the relevant bits of data are in the most significant bit positions, the irrelevant bits in less significant positions should be eliminated by masking.

All four of the transfer formats together with the two modes for applying clock pulses and SYNC signals are applicable to transfers of data words from the peripheral device 122 into the shift register 120 and therethrough to the data bus 121.

The foregoing presents a description of the arrangement and operation of various embodiments of the subject invention. These embodiments together with other embodiments made obvious in view thereof are considered to be within the scope of the invention.

What is claimed is:

1. A data control circuit (18) for controlling the shifting of a data word through a shift register (20 or 120), the circuit including an interval counter (38); means for applying clock pulses (29); a control register for storing format data (37); the circuit being characterized by:
   means (42) for supplying a first signal (INIT) to the interval counter for presetting the interval counter;
   first gate means (40) for controllably transmitting the clock pulses from the applying means to the interval counter;
   second gate means (30) for controllably transmitting the clock pulses from the applying means to the shift register;
   a selection circuit (35) responsive to the format data stored in the control register and to a first count state and subsequent sequential count states of the interval counter for producing a second signal (READY) to fully condition the first gate means in preparation for transmitting the clock pulses to the interval counter and for partially conditioning the second gate means in preparation for transmitting the clock pulses to the shift register;
   means (45) for supplying a synchronization signal to the fully conditioned first gate means for enabling the first gate means for transmitting the clock pulses to the interval counter and for supplying the synchronization signal to the partially conditioned second gate means for fully conditioning the second gate means in preparation for transmitting the clock pulses to the shift register;
   the fully conditioned second gate means being responsive to the format data and being enabled by an occurrence of a second count state and subsequent sequential count states of the interval counter for transmitting the clock pulses to the shift register; and
   the selection circuit (35) being responsive to the format data stored in the control register and to a third count state of the interval counter for inverting the second signal (READY) and thereby disabling the first and second gate means (40 and 30) from transmitting the clock pulses.

2. A data control circuit in accordance with claim 1 further characterized by
   a clock/sync generator (28) for producing the clock pulses being applied through the applying means (29) to the first and second gate means and for generating the synchronization signal being supplied through the supplying means (45) to the first and second gate means for controlling transmission of the clock pulses through the first and second gate means (40 and 30) to the interval counter (38) and the shift register (20 or 120), respectively.

3. A data control circuit in accordance with claim 1 or 2 further characterized by
   means (30, 35, 37, 40) for selectively shifting the data word in the shift register concurrently with occurrence of the synchronization signal.

4. A data transfer circuit (18) arranged for transferring a data word in parallel from a data bus (21) to a shift register (20) and serially from the shift register to a peripheral device (22); the transfer circuit including an interval counter (38); means (28) for applying clock pulses; a control register (37) for storing format data; the data transfer circuit characterized by:
   means (24) for applying a signal (TRANSFER) to the shift register and to the interval counter for loading the data word in parallel from the data bus into the shift register and for resetting the interval counter;
   first gate means (40) for controllably transmitting the clock pulses from the applying means to the interval counter;
   second gate means (30) for controllably transmitting the clock pulses from the applying means to the shift register;
   a selection circuit (35) responsive to the format data stored in the control register and to a first count state and subsequent sequential count states of the interval counter for producing a signal (READY) for fully conditioning the first gate means in preparation for transmitting the clock pulses to the interval counter and for partially conditioning the second gate means in preparation for transmitting the clock pulses to the shift register;
   means (45) for supplying a synchronization signal to the fully conditioned first gate means for enabling the first gate means to transmit the clock pulses to the interval counter and for supplying the synchronization signal to the partially conditioned second gate means for fully conditioning the second gate means in preparation for transmitting the clock pulses to the shift register;
   the fully conditioned second gate means being responsive to the format data and being enabled by a second count state and subsequent sequential count states of the interval counter for transmitting the clock pulses to the shift register, each clock pulse causing the shift register to shift a bit of the data word in serial to the peripheral device; and
   the selection circuit being responsive to the format data stored in the control register and to a third count state of the interval counter for inverting the signal (READY) and thereby disabling the first and second gate means from transmitting the clock pulses to the interval counter and to the shift register, respectively.

5. A data transfer circuit (18) arranged for transferring a data word in serial from a peripheral device (122) to a shift register (120) and in parallel from the shift register to a data bus (121); the transfer circuit including an interval counter (38); means (28) for applying clock pulses; a control register (37) for storing format data; the data transfer circuit characterized by:

first gate means (40) for controllably transmitting the clock pulses from the applying means to the interval counter;

second gate means (30) for controllably transmitting the clock pulses from the applying means to the shift register;

a selection circuit (35) responsive to the format data stored in the control register and to a first count state and subsequent sequential count states of the interval counter for producing a signal (READY) for fully conditioning the first gate means in preparation for transmitting the clock pulses to the interval counter and for partially conditioning the second gate means in preparation for transmitting the clock pulses to the shift register;

means (45) for supplying a synchronization signal to the fully conditioned first gate means for enabling the first gate means to transmit the clock pulses to the interval counter and for supplying the synchronization signal to the partially conditioned second gate means for fully conditioning the second gate means in preparation for transmitting the clock pulses to the shift register;

the fully conditioned second gate means being responsive to the format data and being enabled by a second count state and subsequent sequential count states of the interval counter for transmitting the clock pulses to the shift register, each clock pulse causing the shift register to shift in a bit of the data word in serial from the peripheral device;

the selection circuit being responsive to the format data stored in the control register and to a third count state of the interval counter for inverting the signal (READY) and thereby disabling the first and second gate means from transmitting the clock pulses to the interval counter and to the shift register, respectively; and means (124) for applying a signal (TRANSFER) to the shift register and to the interval counter for transferring the data word in parallel from the shift register onto the data bus and for resetting the interval counter.

* * * * *